(12) United States Patent
Takeda

(10) Patent No.: US 6,774,771 B2
(45) Date of Patent: Aug. 10, 2004

(54) METHOD AND APPARATUS FOR INFORMING A BICYCLE RIDER OF AN UPCOMING SHIFTING OPERATION

(75) Inventor: Kazuhiro Takeda, Sakai (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/267,979

(22) Filed: Oct. 8, 2002

(65) Prior Publication Data

US 2003/0071437 A1 Apr. 17, 2003

(30) Foreign Application Priority Data

Oct. 17, 2001 (JP) ........................................ 2001-319132

(51) Int. Cl.[7] .................................................. B62J 3/00
(52) U.S. Cl. ........................ 340/432; 280/260; 474/110
(58) Field of Search ................................. 340/432, 427; 701/1; 280/236, 260; 474/110, 71, 70

(56) References Cited

U.S. PATENT DOCUMENTS

| 4,490,127 | A | | 12/1984 | Matsumoto et al. |
| 4,642,606 | A | * | 2/1987 | Tsuyama ..................... 340/432 |
| 4,887,249 | A | * | 12/1989 | Thinesen ..................... 368/10 |
| 5,059,158 | A | | 10/1991 | Bellio et al. |
| 5,335,188 | A | * | 8/1994 | Brisson ...................... 702/163 |

* cited by examiner

*Primary Examiner*—Anh V. La
(74) *Attorney, Agent, or Firm*—James A. Deland

(57) ABSTRACT

An apparatus for informing a rider of an upcoming shifting operation in a bicycle transmission includes a running condition detecting mechanism that detects a running condition of the bicycle, a control mechanism that provides a signal that commands the shifting operation when the running condition reaches a threshold value, and a warning mechanism that warns the rider when the running condition approaches the threshold value.

30 Claims, 7 Drawing Sheets

METHOD AND APPARATUS FOR INFORMING A BICYCLE RIDER OF AN UPCOMING SHIFTING OPERATION

BACKGROUND OF THE INVENTION

The present invention is directed to bicycles and, more particularly, to various features of an electronically controlled bicycle transmission.

Automatic transmission devices have been installed on bicycles to conduct appropriate shifting according to the running condition of the bicycle. Such transmissions reduce the burden on the rider to manually operate the transmission and provide for easy and pleasant travel. Automatic transmissions may comprise a motor for driving the transmission, a sensor for detecting a running condition of the bicycle such as bicycle speed, and a control unit for operating the motor based on the detection results.

Some known automatic transmissions include a sound-producing device such as a buzzer or the like, and the sound-producing device produces a sound when a signal for operating the motor is transmitted. As a result, the rider is informed of the shifting operation only at the instant when the actual shifting operation is conducted. Even if the warning sound is generated slightly before the shifting operation, there is little benefit to the rider because the shift operation is conducted immediately thereafter. Usually, the rider wants to know a present riding status relative to a shift operation or whether or not a shift operation is about to be conducted during travel in an automatic operating mode. This is because the rider sometimes has a feeling of discomfort if rapid shifting is conducted unexpectedly.

SUMMARY OF THE INVENTION

The present invention is directed to features of a method and apparatus for informing a rider of an upcoming shifting operation in a bicycle transmission. In one inventive feature, the apparatus comprises a running condition detecting mechanism that detects a running condition of the bicycle, a control mechanism that provides a signal that commands the shifting operation when the running condition reaches a threshold value, and a warning mechanism that warns the rider when the running condition approaches the threshold value. An inventive method comprises the steps of detecting a running condition of the bicycle, providing a signal that commands the shifting operation when the running condition reaches a threshold value, and warning the rider when the running condition approaches the threshold value. Additional inventive features will become apparent from the description below, and such features may be combined with the above features to provide additional inventions.

DETAILED DESCRIPTION OF THE EMBODIMENTS

Figure 1:
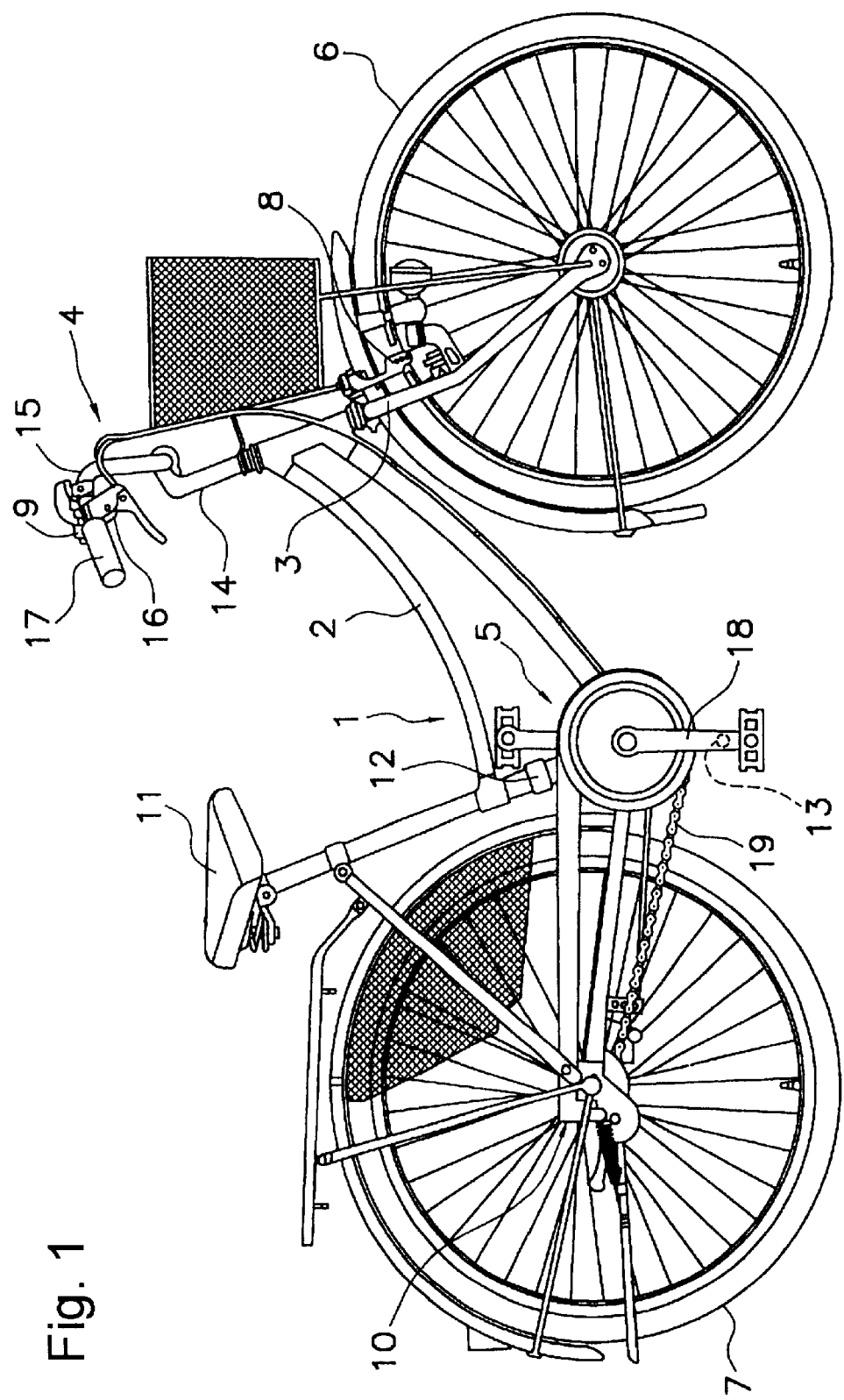
FIG. 1 is a side view of a bicycle that includes an embodiment of an apparatus for informing a rider of an upcoming shifting operation.

FIG. 1 is a side view of a bicycle that includes a particular embodiment of an automatically controlled bicycle transmission. The bicycle comprises a frame 1 having a double-loop-shaped frame body 2, a saddle 11, a front fork 3, a handlebar part 4, a driving part 5, a front wheel 6, a rear wheel 7 in which is installed a three speed internal gear changing hub 10, and front and rear brake devices 8 (only the front brake device is shown in the drawing). The handlebar part 4 has a handlebar stem 14, which is fixed to an upper part of the front fork 3, and a handlebar 15 fixed to the handlebar stem 14. Brake levers 16 and grips 17 are installed on the two ends of the handlebar 15. Brake levers 16 operate the brake devices 8. The drive unit 5 comprises a gear crank 18 rotatably supported by the frame body 2, a chain 19 driven by the gear crank 18, and the internal gear changing hub 10. A cadence sensor 12 for detecting the crank revolutions (cadence) of crank 18 is attached to the frame body 2. The cadence sensor 12 comprises a magnetic reed switch that generates pulses when a magnet 13 attached to the crank 18 moves past it.

Figure 2:
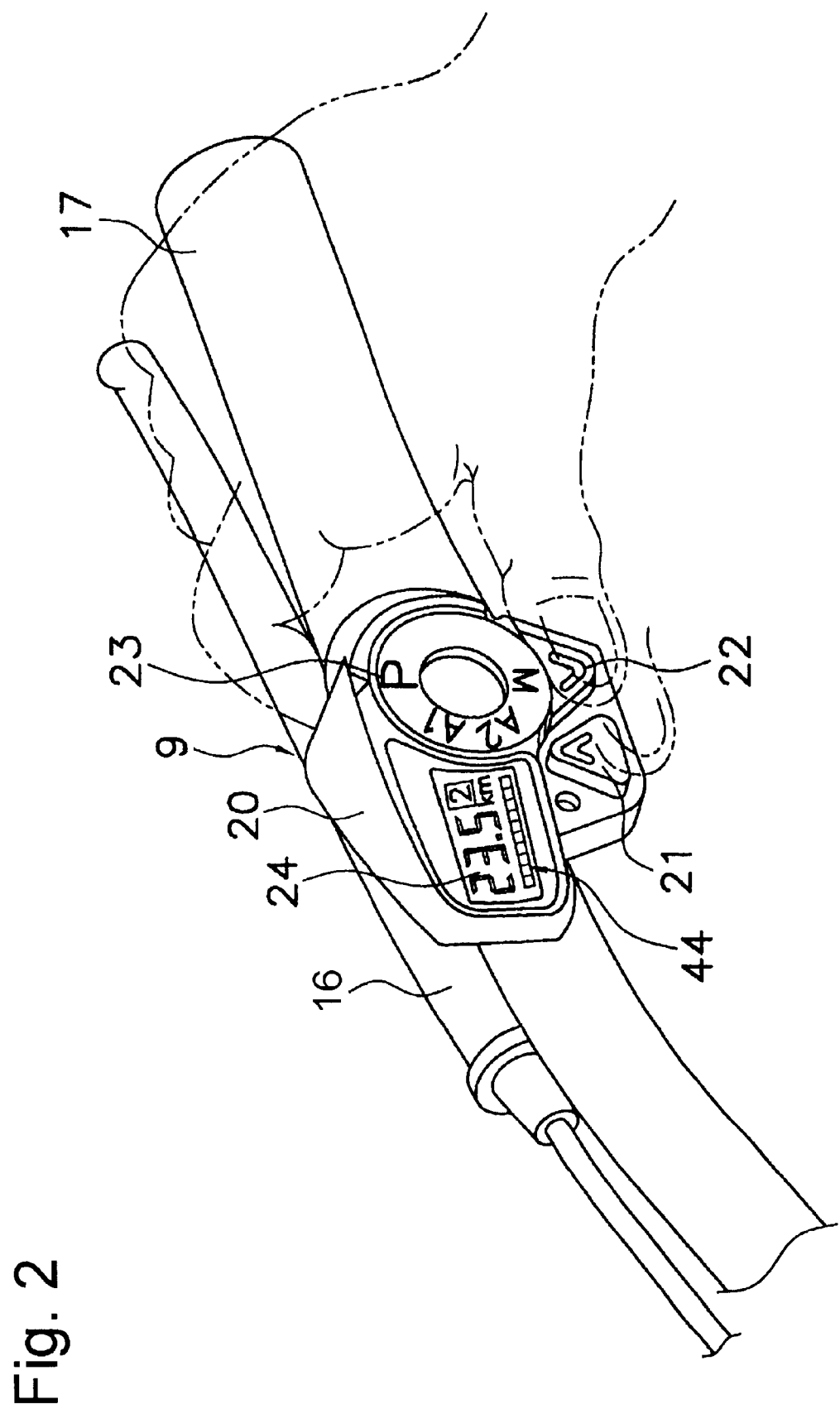
FIG. 2 is a detailed view of a particular embodiment of a handlebar mounted component of the bicycle transmission.

A shift operation unit 9 is mounted on the right-side brake lever 16. As shown in FIG. 2, the shift operation unit 9 has a control housing 20 formed integrally with the right-side (front-wheel) brake lever 16, two control buttons 21 and 22 disposed next to each other to the left and right on the lower portion of the control housing 20, a control dial 23 disposed above the control buttons 21 and 22, and a liquid-crystal display component 24 disposed to the left of the control dial 23.

The control buttons 21 and 22 are triangular push buttons. The control button 21 on the left side is a button for performing shifts to a higher speed step from a lower speed step (upshifts), while the control button 22 on the right side is a button for performing shifts to a lower speed step from a higher speed step (downshifts). The control buttons 21 and 22 also may be used for modifying the shift points (e.g., cadence thresholds) when the transmission is operating in an automatic mode. For example, the control button 21 on the left side may be used for raising the shift point, and the control button 22 on the right side may be used for lowering the shift point.

The control dial 23 is used for switching among three shifting modes and a parking mode (P), and it has four stationary positions: P, A1, A2, and M. The shifting modes comprise an automatic shift 1 (A1) mode, an automatic shift 2 (A2) mode, and a manual shift (M) mode. The parking mode (P) is for locking the internal gear changing hub 10 and controlling the rotation of the rear wheel 7. The automatic shift 1 (A1) and automatic shift 2 (A2) modes are for automatically shifting the internal gear changing hub 10 by means of a cadence signal from cadence sensor 12. The automatic shift 1 (A1) mode is a shift mode primarily used when automatic shifting is performed on level terrain, and the automatic shift 2 (A2) mode is a shifting mode primarily used when automatic shifting is performed on a billy road. Accordingly, the shift timing for downshifts in the automatic shift 2 (A2) mode is set ahead of those in the automatic shift 1 (A1) mode, and the shift timing for upshifts is set behind those in the automatic shift 1 (A1) mode. The manual shift (M) mode is for shifting the internal gear changing hub 10 through the operation of the control buttons 21 and 22.

Figure 4:
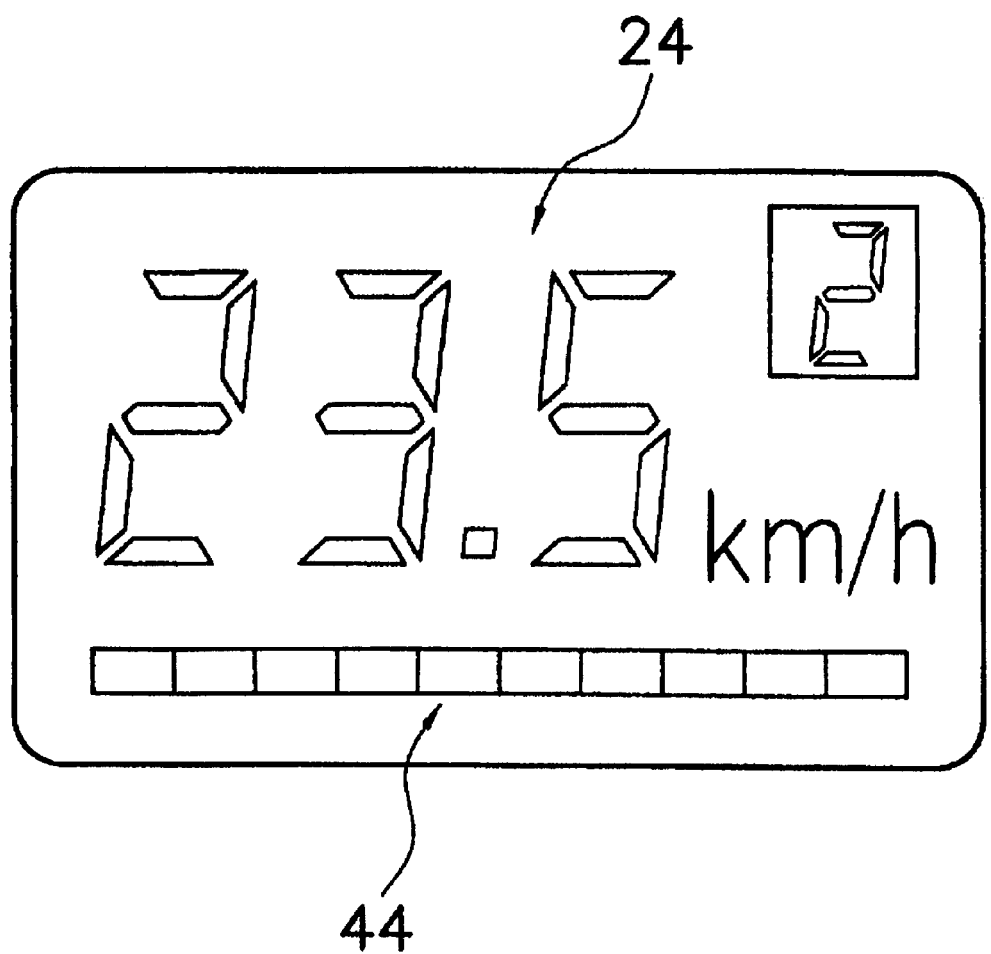
FIG. 4 is a detailed view of the display portion of the handlebar mounted component shown in FIG. 2.

As shown in FIG. 4, the bicycle speed and speed step number are presented in figures on the liquid-crystal display unit 24. Furthermore, an LED display unit 44 comprising a plurality of (e.g., ten) LEDs 44a–44j arranged horizontally in a continuous row in the left-right direction is arranged in the bottom of the liquid-crystal display unit 24. The structure and operation of LED display unit 44 will be described below.

Figure 3:
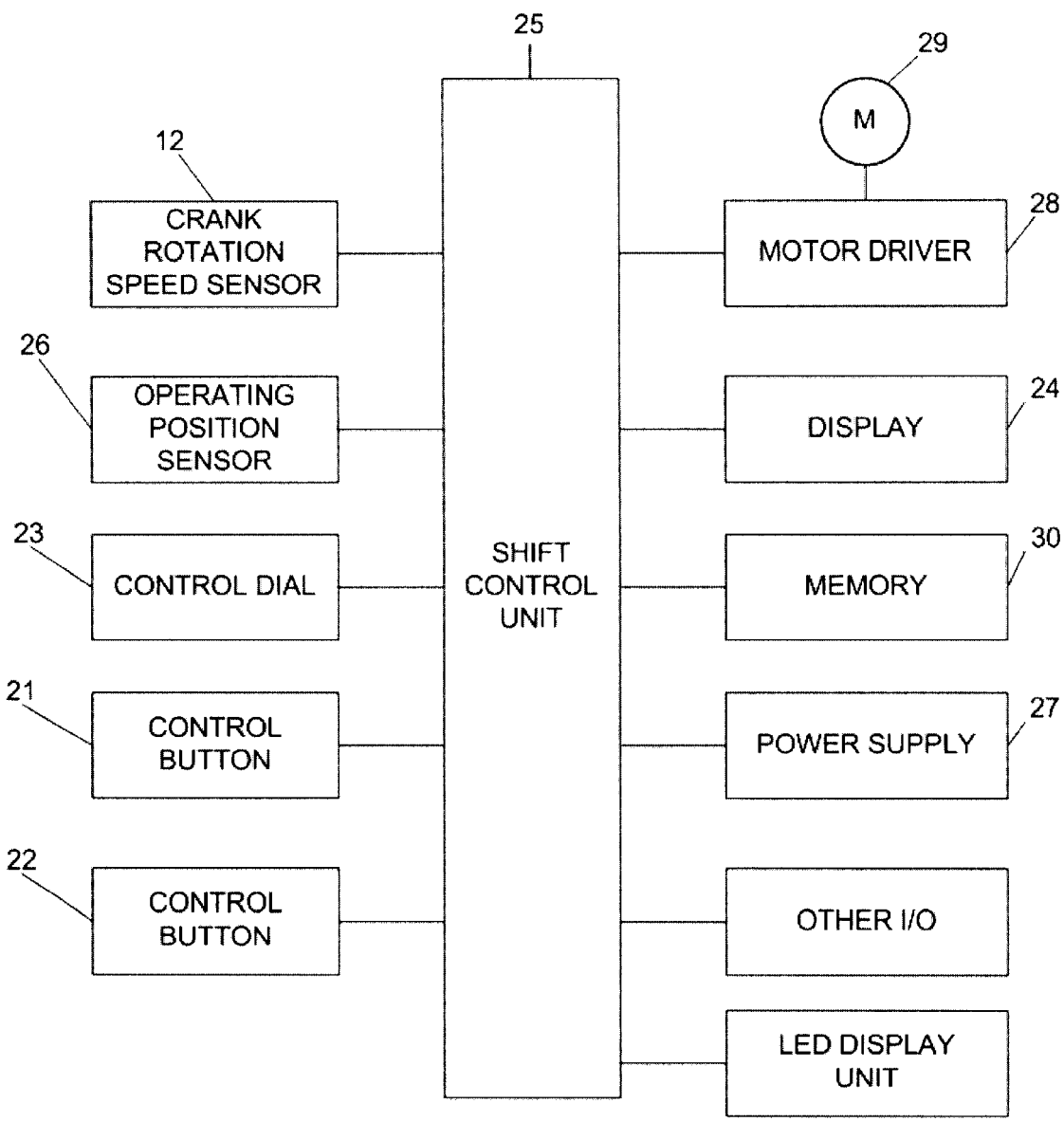
FIG. 3 is a block diagram of a particular embodiment of a shift control device housed within the handlebar mounted component shown in FIG. 2.

A shift control unit 25 (FIG. 3) for controlling shifting operations is housed inside the control housing 20. In general, the shift control unit 25 comprises a microcomputer consisting of a CPU, a RAM, a ROM, and an I/O interface. As shown in FIG. 3, the shift control unit 25 is connected to cadence sensor 12, to an actuation position sensor 26 such as a potentiometer that senses the actuation position (sped step) of the internal gear changing hub 10, to the control dial 23, and to the control buttons 21 and 22. The shift control unit 25 also is connected to a power supply 27 (e.g., a battery), to a motor driver 28 for driving a motor 29, to the liquid-crystal display component 24, to a memory component 30, and to other input/output components. The memory component 30 may be an EEPROM or another type of rewritable nonvolatile memory that contain various operating parameters (such as the upshift and downshift cadence threshold values). The shift control unit 25 controls the motor 29 according to the various modes, and it also controls the display of the liquid-crystal display component 24 including LED display unit 44.

In the automatic shifting modes, the shift control unit 25 controls the internal gear changing hub 10 so that the cadence is maintained at approximately 60–70 RPM, which is a comfortable value for an ordinary person cruising on a bicycle. For this purpose, the cadence threshold for upshifting from the first speed step to the second speed step and from the second speed step to the third speed step is set to 75 RPM, which is slightly above the comfortable range. In order to determine the cadence thresholds for a downshift from the third speed step to the second speed step and from the second speed step to the first speed step, the cadence at the third speed step that corresponds to a cadence of 75 RPM in the second speed step is determined, and the cadence at the second speed step that corresponds to a cadence of 75 RPM in the first speed step is determined. The calculated values are decreased (e.g., by three RPM) and then set as the respective downshift threshold values to provide a hysteresis effect. The hysteresis effect is desirable because upshifting greatly lowers the cadence and may produce an unwanted downshift immediately after the upshift. For example, if the calculated downshift cadence threshold is set to 55 RPM (which corresponds to the 75 RPM upshift cadence threshold of the lower gear), then an unwanted downshift may occur immediately following the upshift, since the cadence is likely to be near 55 RPM after upshifting to the higher gear. Thus, in this embodiment, the upshift cadence threshold values are set comparatively freely, but the downshift cadence threshold values are set appropriately with respect to the upshift cadence threshold values.

LED display unit 44 graphically displays the cadence of the bicycle, thereby warning the rider in advance when shifting will be conducted. In this embodiment, LED display unit 44 comprises a total of ten LEDs, i.e., a first LED 44a, a second LED 44b, a third LED 44c, a fourth LED 44d, a fifth LED 44e, a sixth LED 44f, a seventh LED 44g, an eighth LED 44h, a ninth LED 44i, and a tenth LED 44j, in the order form the left end to the right end. All of the LEDs 44a–44j are of the same color (e.g., red), and they are arranged in a row so that they can be stepwise and continuously turned on and off. More specifically, turning on proceeds from the left-side end to the right-side end, and turning off proceeds from the right-side end to the left-side end.

Figure 5:
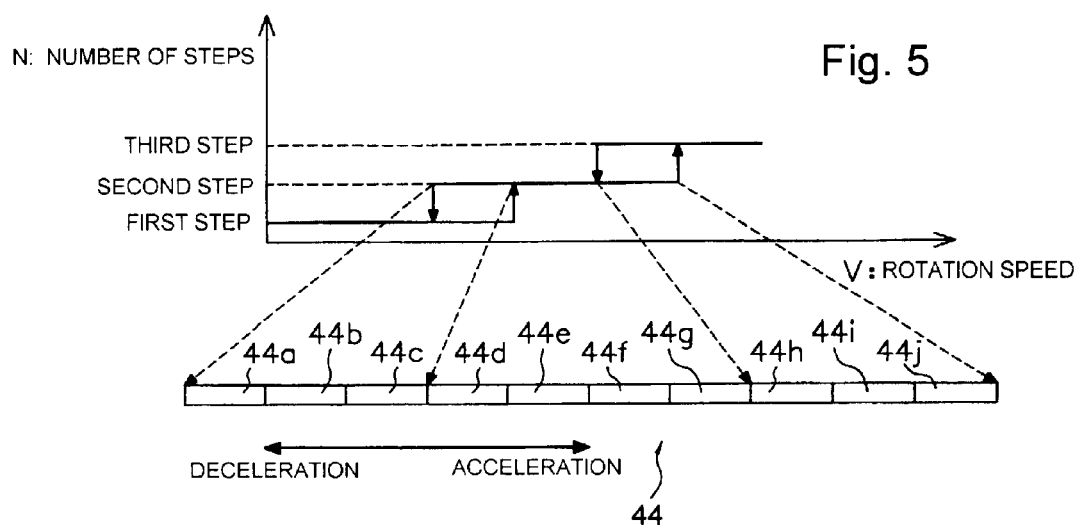
FIG. 5 is a schematic view illustrating the correlation between the speed step, the cadence and the LED's in the display portion.

FIG. 5 is a schematic drawing illustrating the relationship between the cadence, LEDs 44a–44j, speed step number, and shift point when the bicycle is in the second speed step. In this embodiment, the description that follows also applies to the first and third speed steps. Generally speaking, a small number of illuminated lights in the LED display unit 44 means that the cadence is low and a downshift is being approached. Conversely, a large number of illuminated lights in the LED display unit 44 means that the cadence is high and an upshift is being approached. When all of the lights in the LED display unit 44 are turned off, it means that a downshift to the first speed step will be conducted next, and when all of the lights in the LED display unit 44 are turned on, it means that an upshift to the third speed step will be conducted next.

Figure 6:
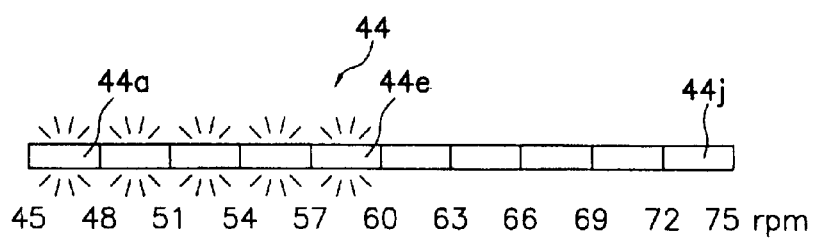
FIG. 6 illustrates the lighting pattern of the LED's, during travel, representing a first range of crank revolutions.

As shown in FIG. 6, there is a correlation between the illumination of LED display unit 44 and the cadence. In this embodiment, the desired interval between the upshift cadence threshold value and the downshift cadence threshold value is divided by the number of lighting elements, and the resulting increments are allocated to the lighting elements. For example, assume the upshift cadence threshold is 75 RPM and the downshift cadence threshold is 45 RPM. The 30 RPM interval is divided into 10 equal parts (for the ten LED's 44a–44j) and results in 3 RPM per LED. The downshift cadence threshold value is allocated to the first LED 44a, and the upshift cadence threshold value is allocated to the tenth LED 44j. If the cadence rises to 75 RPM, then all of the LEDs 44a–44j are turned on, and if the cadence increases further, then an upshift occurs. If the cadence drops to 45 RPM, then all of the LEDs 44a–44j are turned off, and if the cadence decreases further, then a downshift occurs. FIG. 6 shows the state of LED display unit 44 when the cadence is 60 RPM. In this state, LED's 44a–44e are turned on, and the rider understands that an upshift will occur if the remaining five LEDs come on.

Figure 7:
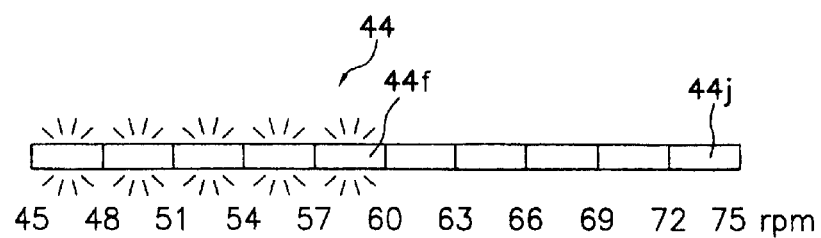
FIG. 7 illustrates the lighting pattern of the LED's, during travel, representing a second range of crank revolutions.

As noted previously, control buttons 21 and 22 may be used to adjust the shift points. Thus, if the rider want to upshift a little earlier, the rider pushes the control button 22 one or more times, and the upshift cadence threshold will decrease according to the number of times the button is pushed. For example, if control button 22 is pushed one time, the upshift cadence threshold will change from 75 RPM to 72 RPM, and the distribution of the shifting interval among the LED's 44a–44f will be adjusted accordingly. Thus, as shown in FIG. 7, a new upshift cadence threshold of 72 RPM is allocated to the tenth LED 44j, and a new downshift cadence threshold of 42 RPM is allocated to the first LED 44a. Assuming the cadence is still 60 RPM, LEDs 44a–44f are turned on with the effect that the illuminated portion of the LED display unit 44 moves in the direction of an earlier upshift. The rider also knows that an upshift will be conducted if the remaining four LEDs are turned on.

Conversely, when the rider wants to upshift a little later, the reverse results can be obtained by pushing the control button 21. By knowing the running condition and shift interval while riding the bicycle, the rider can modify the shift point and obtain a comfortable running condition. Furthermore, modification of the shift point can be instantaneously confirmed.

Figure 8:
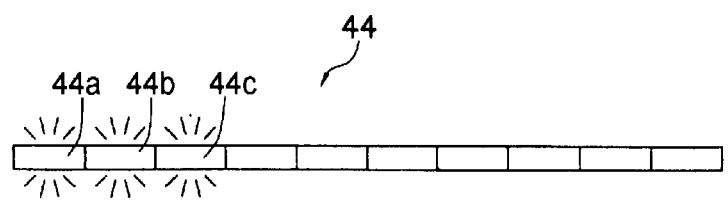
FIG. 8 illustrates the lighting pattern of the LED's immediately after upshifting to a higher gear.
Figure 9:
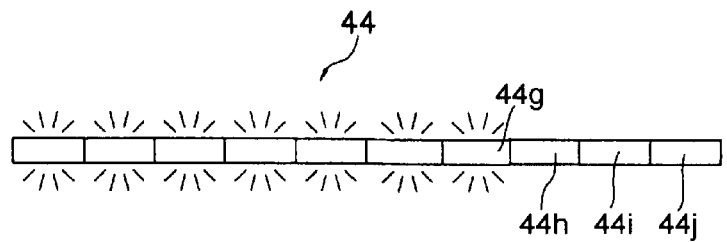
FIG. 9 illustrates the lighting pattern of the LED's immediately after downshifting to a lower gear.

As shown in FIG. 8, as soon as there is an upshift from the first speed step to the second speed step (or from the second speed step to the third speed step), only the three LEDs 44a–44c located at the left end are turned on. Conversely, as shown in FIG. 9, as soon as there is a downshift from the third speed step to the second speed step (or from the second speed step to the first speed step), only the LEDs 44h–44j at the right end are turned off. This illumination state may be maintained for a prescribed time after this instant or shift, and the rider can know that this is a state immediately after shifting. Of course, in this lighting state the LED display unit 44 temporarily does not correspond to the cadence.

Figure 10:
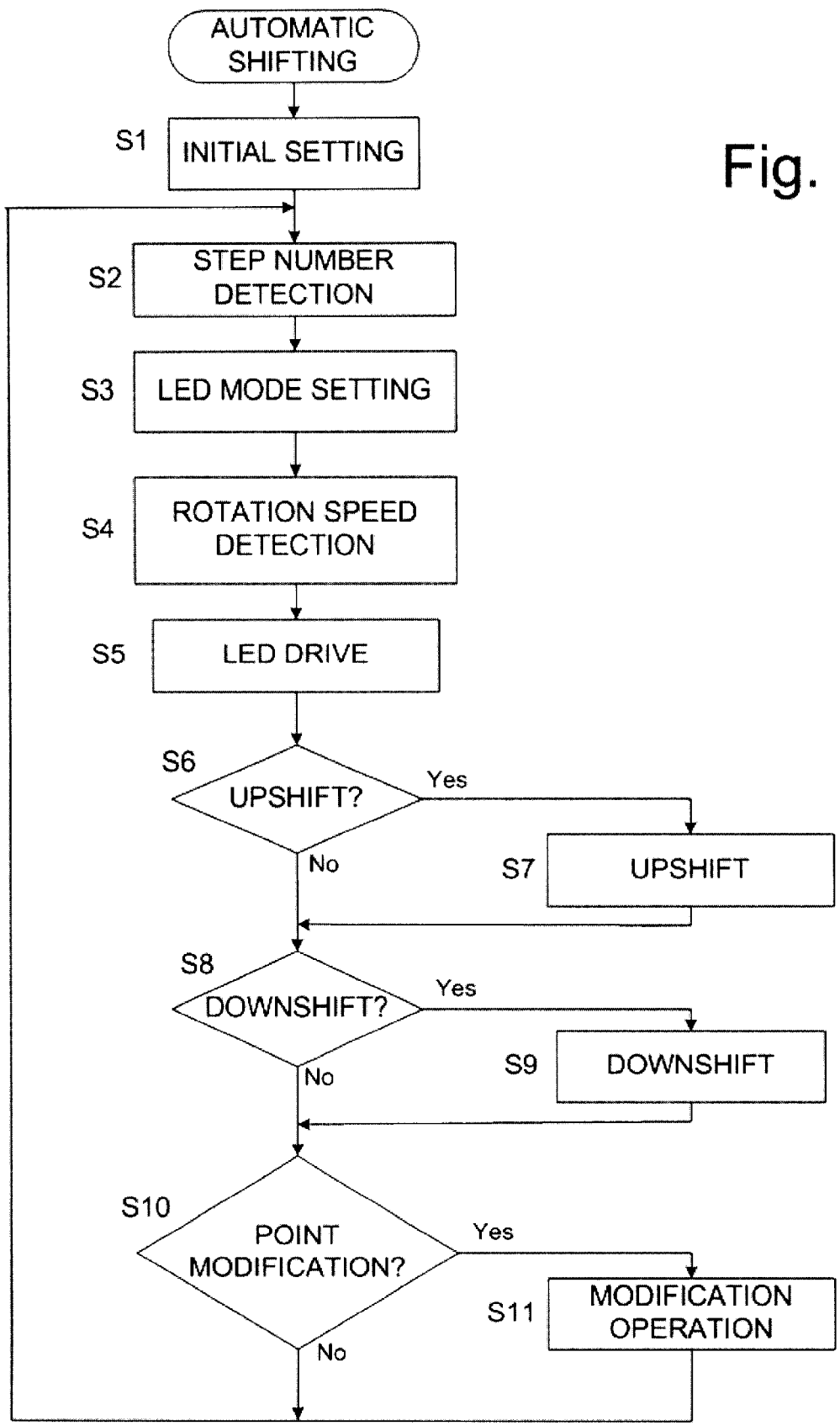
FIG. 10 is a flowchart explaining the operation of the shift control unit.

FIG. 10 is a flowchart explaining the operation of the shift control unit 25 when control dial 23 is set to one of the automatic modes of operation (A1 or A2). Initial settings such as setting various control flags are conducted in step S1. Then, in step S2, the current speed step of the internal gear changing hub 10 is detected based on the signal from the position sensor 26. In step S3, the LED mode (e.g., the allocation of the speed step interval among the lighting elements) stored in the memory component 30 for the current speed step is read and set.

In step S4, the cadence is obtained from the cadence sensor 12, and in step S5 the LED display unit 44 is illuminated according to the detected cadence. In step S6, a decision is made as to whether or not the detected cadence has reached the upshift cadence threshold. If the upshift cadence threshold has been reached, the program proceeds to step S7 wherein the motor 29 is driven to upshift internal gear changing hub 10. In step S8, a decision is made whether or not the detected cadence has reached the downshift cadence threshold. If the downshift cadence threshold has been reached, the program proceeds to step S9 wherein the motor 29 is driven to downshift internal gear shifting hub 10. In step S10, a decision is made whether or not the rider has modified the shift timing (by pressing control button 21 or 22). If the timing has been modified, the program proceeds to step S11, and the upshift and/or downshift cadence thresholds are modified according to which buttons were pressed and by how much. The distribution of the speed step interval among the LED's 44a–44j also is modified (which can include rewriting the contents of memory unit 30). The program then returns to step S2 and the above-described operations are repeated.

By displaying the bicycle running condition, i.e., the cadence serving as reference for a shift point, the distance between the present cadence and shift points, (when shift operations will be conducted) may be ascertained reliably. The rider can know in advance, prior to the shift timing, when shifting will be conducted because the rider will see the running condition of the bicycle approaching the shift threshold as a result of the operation of the LED display unit 44. The rider also is able to confirm that the warning system comprising the LED display unit 44 operates normally.

Because the LED display unit 44 visually conveys the above-described information to the rider, the rider can receive this information only when desired. As a result, the rider is not troubled by unwanted audible signals.

While the above is a description of various embodiments of inventive features, further modifications may be employed without departing from the spirit and scope of the present invention. For example, the number of LED segments is not limited to the above-described embodiment, although 3–12 segments (preferably 5–9 segments) are preferred. In the described embodiment, LEDs were commonly used in all steps, but independent LED groups also may be provided for each step. In the described embodiment, the LEDs were monochromatic, but LEDs emitting different colors also may be used. For example, three LEDs at the left side may be red and other LEDs may be yellow. Three LEDs at the left side and three LEDs at the right side may be red and the four central LEDs may be yellow. In the described embodiment, the interval from the downshift cadence threshold to the upshift cadence threshold were divided into equal parts and allocated to LED's 44a–44j. However, unequal values also may be allocated. In such a case, for example, the allocation can provide more detailed information about changes in the cadence in the stage close to the shift point.

When a display is used as warning means for warning in advance that shifting will be conducted, an upshift lighting unit or a downshift lighting unit may be provided and lighted up, rather than lighting up the lighting units in a stepwise or continuous manner. Warning about an approaching shift operation also may be given by turning on/off the number indicating the gear step or by changing the on/off rate. Text information warning that shifting will be conducted or informing when the shifting will take place may be displayed.

Audio means, rather than video means, also may be used for warning in advance that shifting will be conducted. Thus, a sound-producing device, such as a buzzer and the like, may be used as a warning mechanism. However, in order to warn in advance that shifting will be conducted, the sound should be produced at least 5 seconds before the shift operation. The sound-producing device may produce a voice saying "upshift" or the like as the shift operation approaches. The warning means may produce the sound constantly and change the pitch, tone, or rhythm of the sound as the shift operation approaches. Both the display unit and the sound-producing device may be used, with appropriate switching between the two, if desired.

The warning means may be disengageable. In such a case, when the rider has no desire to know about the shift interval, the rider can completely turn the LEDs and/or audio system off.

Wheel speed, rather than cadence, may be detected as the bicycle running condition. In the above-described embodiment, an internal gear changing hub was used as an example of a shift mechanism. However, the present invention also is applicable to external shift mechanisms comprising a plurality of sprockets and a derailleur. In the above-described embodiment, the shift mechanism was driven by a shift motor, but the present invention is also applicable to shift mechanisms driven by other actuators such as solenoid or electric actuators, hydraulic or pneumatic cylinders, and the like.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An apparatus for informing a rider of an upcoming shifting operation in a bicycle transmission, wherein the apparatus comprises:
   a running condition detecting mechanism that detects a running condition of the bicycle;
   a control mechanism that provides a signal that automatically commands the shifting operation when the running condition reaches a threshold value; and
   a warning mechanism that warns the rider when the running condition approaches the threshold value before the running condition reaches the threshold value and without directly indicating the running condition.

2. The apparatus according to claim 1 wherein the warning mechanism warns the rider by informing about the running condition of the bicycle.

3. The apparatus according to claim 2 wherein the warning mechanism constantly displays information about the running condition of the bicycle.

4. The apparatus according to claim 1 wherein the running condition detecting mechanism detects crank rotation as the running condition.

5. The apparatus according to claim 1 wherein the running condition detecting mechanism detects bicycle speed as the running condition.

6. The apparatus according to claim 1 wherein the warning mechanism comprises a display unit that provides a visual indication that the running condition is approaching the threshold value.

7. The apparatus according to claim 6 wherein the display unit comprises a plurality of lighting units that provide a visual indication that the running condition is approaching the threshold value.

8. The apparatus according to claim 7 wherein the warning mechanism warns that the running condition is approaching the threshold value by varying the illumination of the plurality of lighting units in a stepwise relation to the running condition.

9. The apparatus according to claim 8 wherein the warning mechanism warns that the running condition crossed above the threshold value by turning on all of the plurality of lighting elements an warns that the running condition crossed below the threshold value by turning off all of the plurality of lighting elements.

10. The apparatus according to claim 8 wherein the plurality of lighting units are disposed in a straight line.

11. The apparatus according to claim 10 wherein the plurality of lighting units are disposed horizontally.

12. The apparatus according to claim 6 wherein the display unit displays the running condition in addition to the visual indication that the running condition is approaching the threshold value.

13. The apparatus according to claim 6 wherein the control mechanism includes a shift timing modification mechanism that adjusts the threshold value.

14. The apparatus according to claim 1 wherein the bicycle transmission includes a plurality of speed steps, wherein the control mechanism provides a downshift signal that commands a downshifting operation when the running condition crosses below a downshift threshold value, and wherein the control mechanism provides an upshift signal that commands an upshifting operation when the running condition crosses above an upshift threshold value.

15. The apparatus according to claim 14 wherein the warning mechanism informs the rider when the riding condition approaches the downshift threshold value and the upshift threshold value with a signal that varies by a range between a lower value and an upper value, and wherein the range is the same for each speed step.

16. A method for informing a rider of an upcoming shifting operation in a bicycle transmission, wherein the method comprises the steps of:
   detecting a running condition of the bicycle;
   providing a signal that automatically commands the shifting operation when the running condition reaches a threshold value; and
   warning the rider when the running condition approaches the threshold value before the running condition reaches the threshold value and without directly indicating the running condition.

17. The method according to claim 16 wherein the warning step comprises the step of warning the rider by informing about the running condition of the bicycle.

18. The method according to claim 17 wherein the warning step comprises the step of constantly displaying information about the running condition of the bicycle.

19. The method according to claim 16 wherein the detecting step comprises the step of detecting crank rotation as the running condition.

20. The method according to claim 16 wherein the detecting step comprises the step of detecting bicycle speed as the running condition.

21. The method according to claim 16 wherein the warning step comprises the step of providing a visual indication that the running condition is approaching the threshold value.

22. The method according to claim 21 wherein the visual indication step comprises the step of providing a visual indication that the running condition is approaching the threshold value using a plurality of lighting units.

23. The method according to claim 22 wherein the visual indication step comprises the step of varying the illumination of the plurality of lighting units in a stepwise relation to the running condition.

24. The method according to claim 23 wherein the warning step comprises the steps of:
   warning that the running condition crossed above the threshold value by turning on all of the plurality of lighting elements; and
   warning that the running condition crossed below the threshold value by turning off all of the plurality of lighting elements.

25. The method according to claim 23 wherein the plurality of lighting units are disposed in a straight line.

26. The method according to claim 25 wherein the plurality of lighting units are disposed horizontally.

27. The method according to claim 21 further comprising the step of displaying the running condition in addition to the visual indication that the running condition is approaching the threshold value.

28. The method according to claim 21 further comprising the step of adjusting the threshold value.

29. The method according to claim 16 wherein the bicycle transmission includes a plurality of speed steps, and further comprising the steps of:
   providing a downshift signal that commands a downshifting operation when the running condition crosses below a downshift threshold value; and providing an upshift signal that commands an upshifting operation when the running condition crosses above an upshift threshold value.

30. The method according to claim 29 wherein the warning step comprises the step of informing the rider when the riding condition approaches the downshift threshold value and the upshift threshold value with a signal that varies by a range between a lower value and an upper value, wherein the range is the same for each speed step.

* * * * *